(12) United States Patent
Savstrom

(10) Patent No.: US 12,194,396 B2
(45) Date of Patent: *Jan. 14, 2025

(54) PERIODIC RADIAL SYMMETRY FOR FILTER PLEATING

(71) Applicant: DONALDSON COMPANY, INC., Minneapolis, MN (US)

(72) Inventor: Jacob Curtis Savstrom, Mound, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/127,263

(22) Filed: Mar. 28, 2023

(65) Prior Publication Data

US 2023/0233961 A1 Jul. 27, 2023

Related U.S. Application Data

(63) Continuation of application No. 16/771,793, filed as application No. PCT/US2018/064176 on Dec. 6, 2018, now Pat. No. 11,633,679.

(Continued)

(51) Int. Cl.
*B01D 29/21* (2006.01)
*B01D 46/24* (2006.01)
*B01D 46/52* (2006.01)

(52) U.S. Cl.
CPC .......... *B01D 29/21* (2013.01); *B01D 46/2411* (2013.01); *B01D 46/522* (2013.01);
(Continued)

(58) Field of Classification Search
CPC .. B01D 29/21; B01D 46/2411; B01D 46/522; B01D 46/523; B01D 2201/122;
(Continued)

(56) References Cited

U.S. PATENT DOCUMENTS 2,627,350 A    2/1953  Wicks
4,655,921 A *  4/1987  Fujimoto ............. B01D 46/523
                                                   210/489

(Continued)

FOREIGN PATENT DOCUMENTS

DE    4345130 C1    11/2000
JP    6115021 U     1/1986
(Continued)

OTHER PUBLICATIONS

International Search Report for co-pending PCT/US2018/064176, 5 pages, Mar. 7, 2019.

(Continued)

*Primary Examiner* — Waqaas Ali
(74) *Attorney, Agent, or Firm* — Kagan Binder, PLLC

(57) ABSTRACT

A cylindrical filter element having a central longitudinal axis and filter media including a plurality of radially extending pleats arranged in a pattern that repeats around the central longitudinal axis. Each of the pleats comprises an inner pleat tip, wherein the inner pleat tips of each pattern define an open area that extends along a height of the filter element, and wherein each pattern of pleats comprises a first series of intermediate pleats that descends in length from a major pleat to a minor pleat and a second series of intermediate pleats that ascends in length from the minor pleat to a major pleat of an adjacent pattern of pleats.

13 Claims, 5 Drawing Sheets

Related U.S. Application Data

(60) Provisional application No. 62/598,692, filed on Dec. 14, 2017.

(52) U.S. Cl.
CPC ...... *B01D 46/523* (2013.01); *B01D 2201/122* (2013.01); *B01D 2201/127* (2013.01); *B01D 2201/291* (2013.01); *B01D 2265/06* (2013.01)

(58) Field of Classification Search
CPC ........ B01D 2201/127; B01D 2201/291; B01D 2265/06; B01D 29/232
See application file for complete search history.

(56) References Cited

U.S. PATENT DOCUMENTS

| | | |
|---|---|---|
| 6,702,941 B1 | 3/2004 | Haq et al. |
| 2003/0024872 A1 | 2/2003 | Muzik et al. |
| 2011/0139008 A1 | 6/2011 | Smithies et al. |

FOREIGN PATENT DOCUMENTS

| | | |
|---|---|---|
| JP | S63293039 A | 11/1988 |
| JP | 07243356 A | 9/1995 |
| JP | 10244104 A | 9/1998 |
| SU | 436668 A1 | 7/1974 |

OTHER PUBLICATIONS

Notice of Reasons for Refusal for co-pending Japanese Patent Application No. 2020-530964, 8 pages, Nov. 7, 2022.

English Translation of Notice of Reasons for Rejection for co-pending Korean Patent Application 10-2020-7019925, 6 pages, Jan. 12, 2024.

* cited by examiner

PERIODIC RADIAL SYMMETRY FOR FILTER PLEATING

CROSS REFERENCE TO RELATED APPLICATIONS

This application is a continuation application of U.S. patent application Ser. No. 16/771,793, filed Jun. 11, 2020, now allowed, which is the U.S. national phase of International Application No. PCT/US2018/064176, filed on Dec. 6, 2018, which in turn claims the benefit of U.S. Provisional Application No. 62/598,692, filed Dec. 14, 2017, the entire contents of which are incorporated herein by reference in their entireties.

TECHNICAL FIELD

The present invention relates to filters, and more particularly to pleated filter elements arranged in a cylindrical configuration for use in filter assemblies.

BACKGROUND

Fluid filters are commonly used for removing contaminants from liquid or gas to prevent damage to downstream components, such as an engine. Filtration systems are generally configured so that incoming contaminated fluid moves along a flow path until it encounters filter material. As the fluid passes through the filter material, a sufficient amount of the contaminants will be captured by the filter material so that the fluid exiting the filter is considered to be clean enough for the particular use of the resultant fluid.

A wide variety of filter configurations are available for use in different applications. In relatively simple configurations, a single flat sheet of filter material is positioned in the fluid path so that contaminated fluid flows from a "dirty" side of the filter material to the "clean" side, wherein the flat filter sheet is particularly designed of filter material that will capture contaminants of a certain size and/or composition. In order to provide additional filtration capabilities, it is common to pleat the filtration material to increase the amount of filter media used in the same space. In particular, the filter media can be folded in an accordion-like manner to produce multiple pleats across the width of material. The pleats for these arrangements typically include pleats of the same or similar height across the width of the media pack.

In order to fit into a particular opening and/or to further increase the amount of filter material provided in a given volume, pleated filter material can also be arranged into cylindrical configurations in which pleats extend in a radial direction, such as from a central core area about which the pleated material is wrapped. In such a configuration, contaminated fluid can enter the media pack through the sides of the cylinder, pass through the pleated filter media, and then exit the filter through a central core area. Due to the geometry of such cylinders, inner pleat tips near the central core area are more tightly packed than outer pleat tips near the outside of the cylinder. The relative size of the core in such an arrangement is an important parameter in determining the amount of filter material that can be provided in a given space. In order to further utilize the outer periphery where the pleats are spaced further apart, cylindrical filter elements have been provided with pleats of varying lengths extending radially inward from the outer periphery of the filter between pleats that extend all the way to the central core. One challenge presented by such arrangements is the tendency of the shorter pleats to migrate toward the central core area or otherwise move away from the configuration in which the filter is originally manufactured.

While configurations described above can be adequate for many filtration applications, there is a need to provide pleat configurations for filter material that can further increase the amount of pleated material available in a given filtration space while maintaining their desired configuration.

SUMMARY

In accordance with the invention, a number of pleat configurations are provided for cylindrical filter elements that increase the media included in a given volume while providing other beneficial properties. These filter elements can be used in engine and industrial liquid applications, bulk filtration, or any liquid application where increased media per unit volume is desirable. The filter element configurations include a pleated sheet of material with variations in pleat heights in a pattern around the circumference of the element, wherein each pleat is supported by a neighboring shorter pleat in a manner that minimizing bagging of the pleats. This same configuration of pleats creates a number of internal inlet/outlet passages with increased media area for a given volume, and also provides control over the inlet/outlet passage velocity that is independent of pleat depth.

In certain embodiments of the invention, the pleating configuration can yield nearly 50% more media than in similar configurations with uniformly sized pleats. In one embodiment, pleats arranged in a repeating pattern around the circumference, with each instance of the pattern starting with a long or major pleat that is nearly 50% of the element diameter and tapering down to a much smaller length, where the manufacturing limitations for folding the material can be instrumental in determining the smallest pleat height. The nature of the reduction in pleat height throughout the pattern and the pleat spacing is designed to create a series of inlet/outlet channels that cooperate with an open endcap with a corresponding opening that generally resembles flower petals or a fan blade. The sequence of pleat heights in the pattern can be designed or "tuned" to create a desired inlet/outlet channel area. With certain embodiments, the major pleats of each pattern can be bonded to each other or a glue bead at the center of the cylindrical filter element (e.g., at its central longitudinal axis) to offer additional support to the filter media without interfering with the fluid flow during filtration.

In accordance with an embodiment, a cylindrical filter element is provided, comprising a central longitudinal axis and filter media comprising a plurality of radially extending pleats arranged in a pattern that repeats around the central longitudinal axis. An outer cylindrical periphery of the filter media is defined by an outer pleat tip of each of the plurality of radially extending pleats, and each pattern of pleats includes: a major pleat having a first length and extending radially from the outer pleat tip at the outer cylindrical periphery to an inner pleat tip at the central longitudinal axis; a minor pleat spaced from the major pleat, the minor pleat comprising a second length that is less than the first length and extending radially toward the central longitudinal axis from the outer pleat tip at the outer cylindrical periphery to an inner pleat tip; at least a first intermediate pleat positioned between the major pleat and the minor pleat and having a length between the first length of the major pleat and the second length of the minor pleat; and at least a second intermediate pleat positioned between the minor pleat and the major pleat of an adjacent pattern of pleats and having a length between the second length of the minor pleat and the first length of the major pleat of the adjacent pattern of pleats.

In another embodiment, a cylindrical filter element is provided that includes a central longitudinal axis and filter media that includes a plurality of radially extending pleats arranged in a pattern that repeats around the central longitudinal axis. Each of the pleats comprises an inner pleat tip, wherein the inner pleat tips of each pattern define an open area that extends along a height of the filter element, and wherein each pattern of pleats comprises a first series of intermediate pleats that descends in length from a major pleat to a minor pleat and a second series of intermediate pleats that ascends in length from the minor pleat to a major pleat of an adjacent pattern of pleats.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
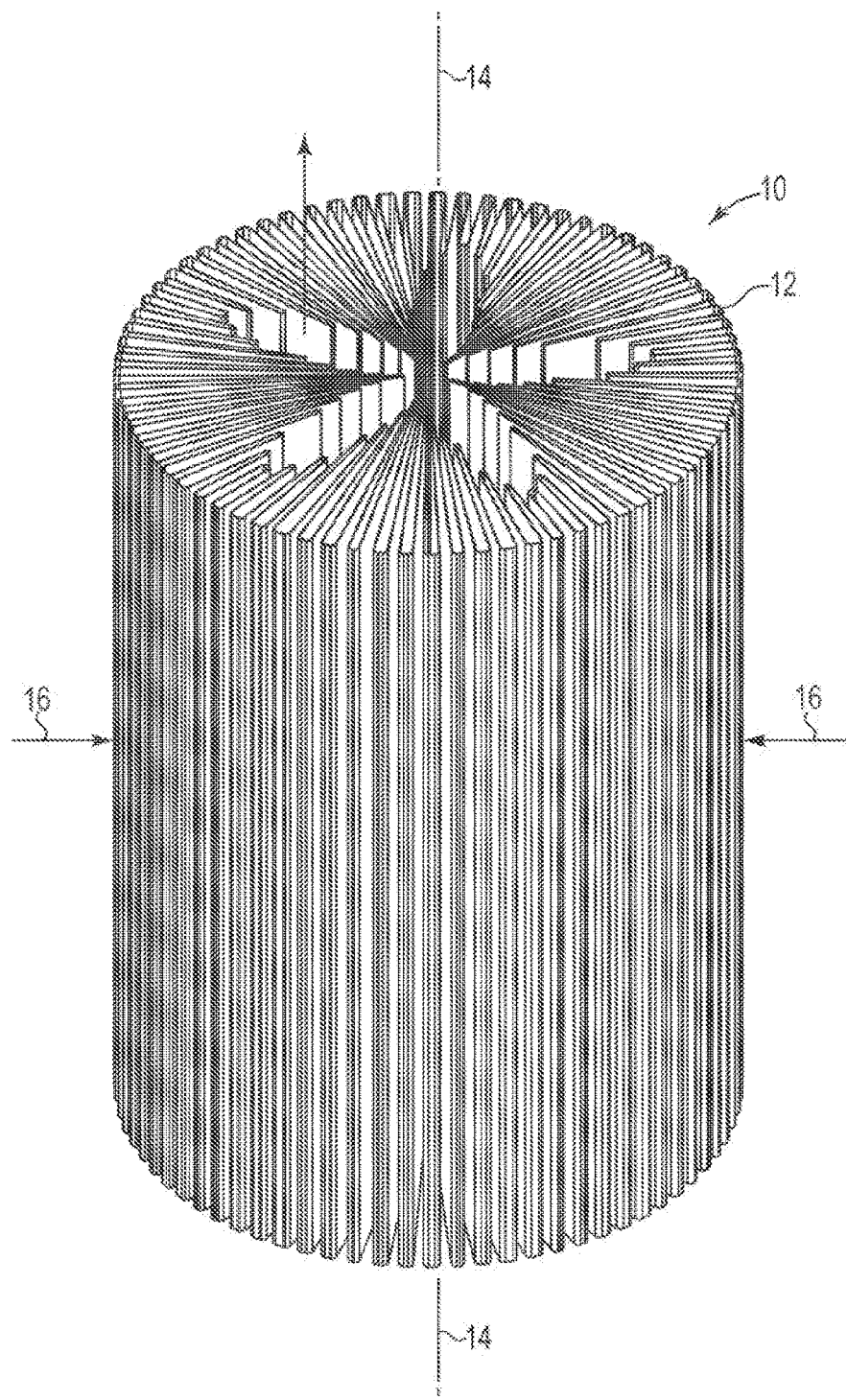
FIG. 1 is a perspective view of an embodiment of a pleated filter of the invention, including a representation of an exemplary fluid flow path during a filtration process.

Referring now to the Figures, wherein the components are labeled with like numerals throughout the several Figures, and initially to FIG. 1, a perspective view of a cylindrical filter 10 of the invention is illustrated, along with arrows illustrating an exemplary direction of fluid flow during a filtration process. As shown, filter 10 includes pleated filter material 12 arranged in a cylindrical configuration around a central longitudinal axis 14, wherein the material includes pleats having varying lengths arranged in a pattern that repeats a certain number of times around its circumference. In this embodiment, fluid enters the filter 10 through its sides or outer periphery, as indicated by arrow 16, and exits through a number of openings (which will be described below) in a direction indicated generally by arrow 18. The fluid may alternatively be directed in the opposite direction from that shown and/or the fluid can move toward and/or away from the filter at angles other than parallel and perpendicular to the central axis 14.

As described and illustrated, the filter configurations of the invention are provided as a cylinder with a circular end profile. It is understood, however, that the filter element can be non-cylindrical in shape, such as at least slightly oval or elliptical in shape, a racetrack type of shape or other regular or irregular shapes. Further, the various configurations can be symmetric about a plane that runs perpendicular to the longitudinal axis 14, or the configurations can be asymmetric.

The pleated filter material 12 can be selected from a number of different materials, such as a non-woven material sheet (e.g., melt blown material) or micro porous membranes (e.g., nylon, poly(tetrafluoroethylene) (PTFE), polypropylene, polyethylene, and the like). The pleated filter material 12 can be provided as a sheet that is foldable multiple times to create the desired pattern and therefore is provided with a thickness that will allow it to fold back on itself and maintain the folded pattern.

The term "pleat" used herein refers generally to the V-shaped configurations of filter material that include two adjacent arms with distal ends that meet at an outer periphery of the cylindrical filter at a "peak". Each of those arms also includes a proximal end that is spaced radially inward from the outer periphery to define a portion of a V-shaped configuration internal to the outer filter periphery at a "valley." Further, while a V-shape is described, the tip or point of the V-shape can be at least slightly rounded, where the radius of the tip is a function of the pleating method and tools used, along with the thickness of the filter material. Various arrangements of these peaks and valleys for the filter material are described below in more detail.

Figure 2:
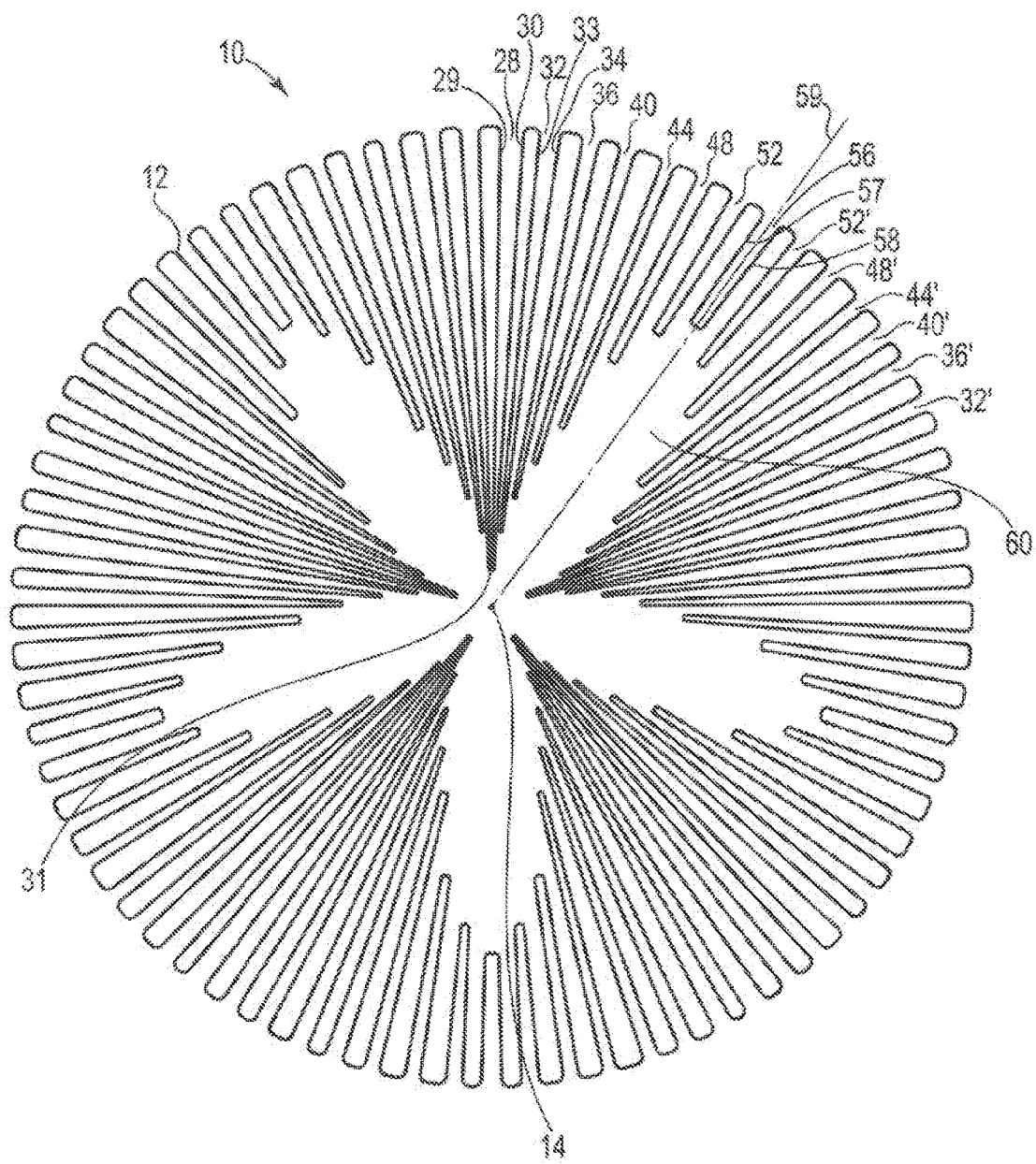
FIG. 2 is a top schematic view of the pleated filter of FIG. 1.

Referring additionally to FIG. 2, a top view of the cylindrical filter 10 of FIG. 1 is illustrated. The filter material 12 is arranged in a pattern that starts at pleat 28, which includes a first arm 29 and an adjacent second arm 30 that meet at a V-intersection 31 with its inner fold or "valley" positioned at or near the longitudinal axis 14. Due to the relatively dense amount of filtration material in this area, the two arms may have little to no space between them, particularly near the fold lines. In an embodiment of the invention, the first arm 29 and second arm 30 will extend toward the longitudinal axis 14 by a distance that is in a range between 75% and 100% of the radius of the cylindrical filter 10, wherein the illustrated embodiment shows this length as extending more than 90% of the radial distance from the outer periphery of the cylinder to the central longitudinal axis 14. Pleat 28 can therefore be referred to as the longest or the "major" pleat of the pattern. In an embodiment, arms 29, 30 of pleat 28 have approximately the same length so that the pleat is considered to be symmetric about a radial plane (not shown) that bisects the space between arms 29, 30; however, one of the arms 29, 30 can optionally be shorter than the other arm of this pleat 28.

The pattern of pleats then continues in a clockwise direction with an adjacent or "minor" pleat 32 that includes an arm 33 extending from its distal end at the outer periphery of the cylinder toward the central axis 14. In accordance with the invention, the length of arm 33 is at least slightly shorter than the length of arm 30 of the previous pleat 28 of the pattern. Pleat 32 also includes an arm 34 that meets arm 33 at a V-intersection 35 with its inner fold or "valley" spaced further from the central axis 14 than the V-intersection 31 of the previous pleat 28. As was described relative to the arms of pleat 28, arm 34 can have approximately the same length as arm 33, although it is possible that arm 34 is slightly shorter than arm 33.

This pattern continues in a clockwise direction around the cylindrical filter 10 in a similar progression to that described relative to pleats 28 and 32, in that each progressive minor pleat in the pattern contains arms that are at least slightly shorter than the arms of the previous pleat of the pattern, with their distal ends all being located at the outer periphery of the cylinder. In this particular embodiment, the exemplary pattern includes: a pleat 40 adjacent to pleat 36 and having at least one arm that is shorter than the arms of pleat 36; a pleat 44 adjacent to pleat 40 and having at least one arm that is shorter than the arms of pleat 40; a pleat 48 adjacent to pleat 44 and having at least one arm that is shorter than the arms of pleat 44; a pleat 52 adjacent to pleat 48 and having at least one arm that is shorter than the arms of pleat 48; and a pleat 56 adjacent to pleat 52 and having at least one arm that is shorter than the arms of pleat 52. In this embodiment, pleat 56 comprises the two shortest arms 57, 58 of the pattern, and when these arms are the same length, the pleat 56 will be considered symmetric about a radial plane 59 that bisects the space between arms 57, 58.

As described above, the pleat pattern includes pleats that first sequentially decrease in length from the major pleat 28 to the shortest minor pleat 56. In a continuation of the pleat pattern, the pattern includes pleats that sequentially increase in length from the shortest pleat 56 to a major pleat that is the first pleat of the next pattern of pleats. In particular, a pleat 52' is adjacent to pleat 56 and includes at least one arm that is at least slightly longer than the arms of minor pleat 56. Pleat 52' can have arms that are identical or similar in length to the arms of pleat 52, thereby providing symmetry for this portion of the pattern about the radial plane 59. Alternatively, the arms of pleat 52' can have a different length than the arms of pleat 52 so that the pattern is not symmetric about the radial plane 59.

The pattern continues in a clockwise direction in a similar progression to that described above relative to pleats 56 and 52', in that each progressive minor pleat in the sequence contains arms that are at least slightly longer than the arms of the previous pleats of the pattern, with their distal ends being located at the outer periphery of the cylinder. The illustrated pattern provides for symmetry about the radial plane 59, and therefore includes pleats 48', 44', 40', 36', and 32' that have arms with a length that are the same or similar to their mirrored counterpart pleats 48, 44, 40, 36, 32, respectively. The pattern can be considered to end at the pleat 32', as the next pleat adjacent to pleat 32' is another major pleat that is the start of the next repeating pattern sequence around the cylindrical filter 10. As shown and described, this particular pattern includes fourteen pleats; however, it is understood that more or less pleats can be used in a particular pattern. It is further contemplated that the pleat patterns around the circumference of the filter can all have the same or a different number of pleats than the other patterns for that filter.

With the pattern shown and described relative to FIG. 2, a flow channel or opening 60 is defined by the inner pleat tips of each pleat of the pattern. When the number of pleats for each pattern is similar to that shown in FIG. 2, and when the sequential increase and decrease in pleat lengths is proportionally similar to that of FIG. 2, each flow channel 60 will have a shape that is oval, pedal, or eye-shaped, as illustrated. However, the number and size of the pleats in the patterns can vary considerably such that the shape of each flow channel 60 can be different than shown. For example, more or less pleats can be provided than in the illustrated embodiment, and/or the amount of height difference for adjacent pleats can be greater or less than shown, which can provide for a more staggered or smoother pattern created by the inner pleat tips.

The embodiment of FIG. 2 includes five repeats of the pattern described above, which therefore includes five major pleats and provides for five flow channels or openings 60. Each of the major pleats can extend at least 75% of the radius of the cylinder, and in this embodiment the major pleats extend more than 90% of the radial distance to the central axis 14. The inner pleat tips of the major pleats can be adhered or otherwise attached to a small core that extends along the central axis 14 (not shown), or in a case where the inner pleat tips extend almost to the central axis 14, the inner pleat tips can be adhered to each other along the height of the cylinder with a glue bead (not shown). If a core is provided, it can be either solid or hollow, and will generally have as small of a diameter as possible in order to maximize the filter media provided in these filters. Any core used can be round or have a different shape, where the core shape can match the outer peripheral shape of the filter or can have a different shape.

Figure 3:
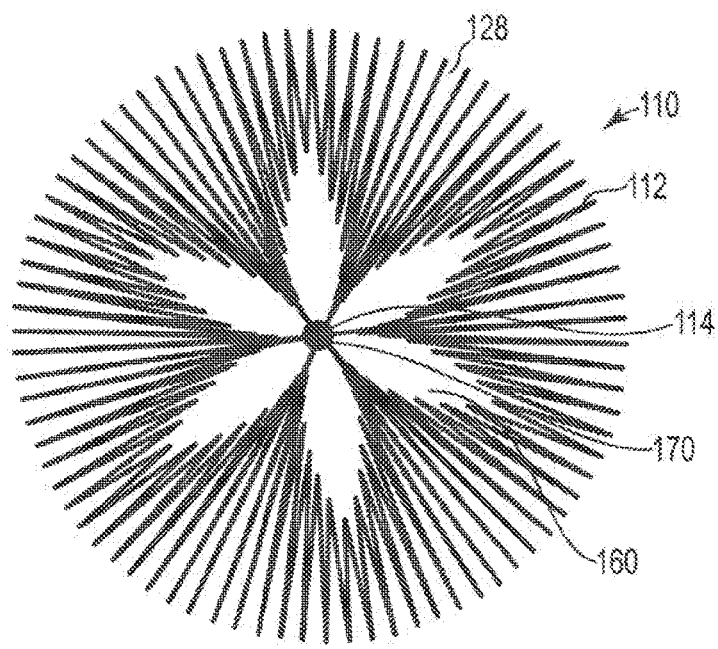
FIG. 3 is a top schematic view of an embodiment of a pleated filter of the invention.

Referring now to FIG. 3, another pattern of pleated material for a cylindrical filter 110 is illustrated, which is made of pleated filter material 112 that is arranged in a pattern about a central longitudinal axis 114. This pattern also starts at a pleat 128, which includes arms that meet at a V-intersection with an inner fold or "valley" positioned at or near the longitudinal axis 114. The arms of this pattern extend toward the longitudinal axis 114 by a distance that is in a range between 75% and 100% of the radius of the cylinder, wherein the illustrated embodiment shows this length as extending the entire distance from the outer periphery of the cylinder to the central longitudinal axis 114 (i.e., approximately 100% of the radial distance). Pleat 128 can therefore be referred to as the longest or the "major" pleat of the pattern. In this embodiment, a glue bead 170 is illustrated along the central axis 114, which is used to secure the longest or major pleats in each pattern. In an embodiment, the arms that make up pleat 128 have the same length so that the pleat is considered to be symmetric about a radial plane (not shown) that bisects the space between its arms; however, as with the embodiment of FIG. 2, one of the arms can optionally be shorter than the other arm of this pleat 128.

The pattern of pleats for cylindrical filter 110 continues around its circumference with each progressive minor pleat in the sequence containing arms that are at least slightly shorter than the arms of the previous pleats of the pattern until reaching the smallest pleat of the pattern. With this repeating pattern around the circumference of filter 110, six flow channels or openings 160 will be defined by the inner pleat tips of each sequence of pleats. As shown, the flow channels 160 are again generally oval or eye-shaped.

Figure 4:
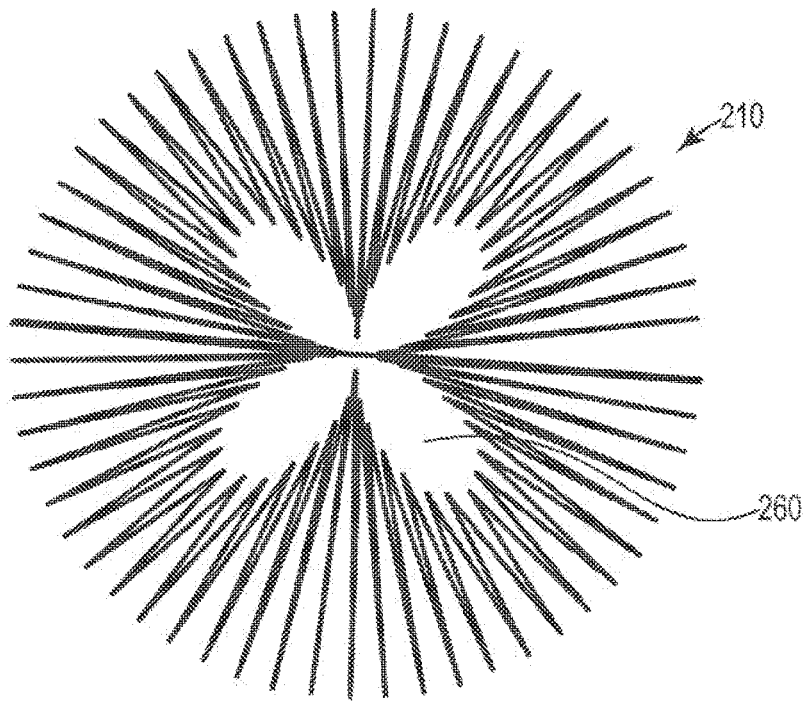
FIG. 4 is a top schematic view of an embodiment of a pleated filter of the invention.
Figure 5:
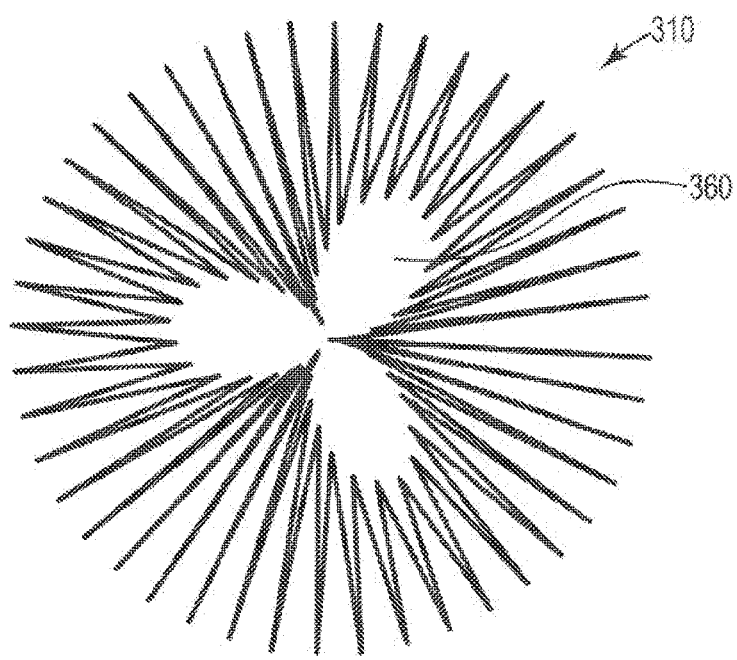
FIG. 5 is a top schematic view of an embodiment of a pleated filter of the invention.
Figure 6:
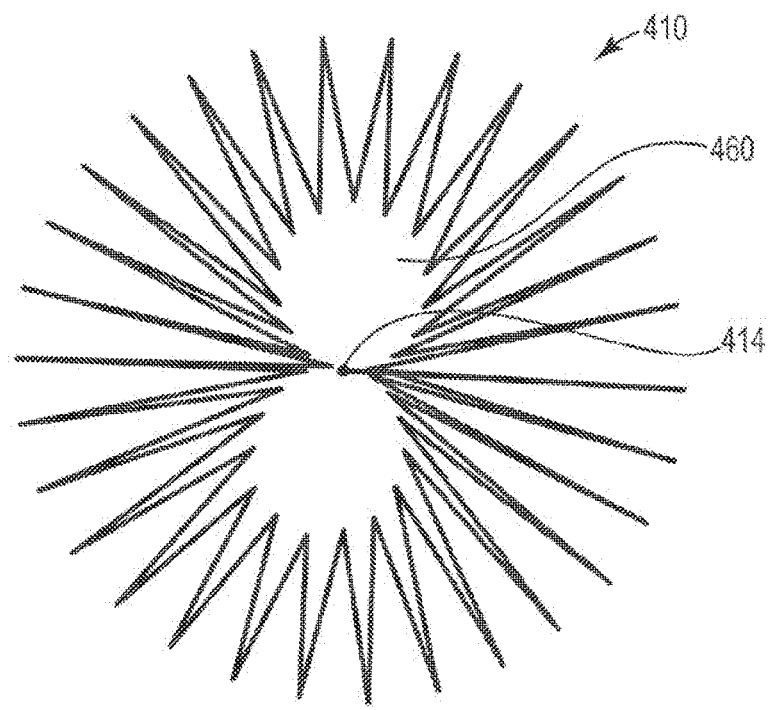
FIG. 6 is a top schematic view of an embodiment of a pleated filter of the invention.

FIG. 4 illustrates yet another variation of the number of repeating patterns that are provided around the circumference of a cylindrical filter 210, with this figure providing an embodiment having four oval or eye-shaped openings or channels 260. As illustrated, the density of filter material used for the cylindrical filter 210 is less than the density of filter material provided in FIGS. 1-3. Similarly, the embodiment of a cylindrical filter 310 of FIG. 5 provides for three oval or eye-shaped openings or channels 360 such that the structure will have an even smaller density of filter material than the configurations of FIGS. 1-4. Finally, FIG. 6 illustrates an embodiment of a filter 410 that includes two flow channels 460 situated on opposite sides of a central axis 414. Due to the geometry of having only two of these channels 460 while providing a stable assembled version of the filter, these flow channels 460 are more circular in shape.

Cylindrical filter 10 can be closed at one or both ends by end caps, which can be designed to engage with an apparatus in which the filter will be installed and therefore can include a wide variety of flanges or other features for such an engagement. Each end cap can be attached to the pleated filter material with any desired method, such as adhesives, epoxy, thermal or ultrasonic welding, mechanical fasteners, and/or combinations of attachment techniques.

Figure 7:
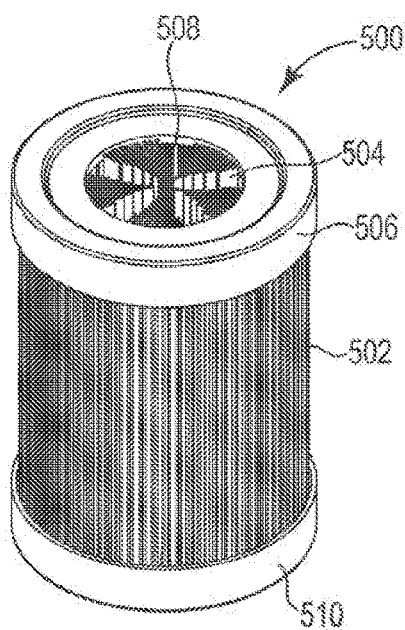
FIG. 7 is a perspective view of an embodiment of a pleated filter assembly of the invention that includes end caps.
Figure 8:
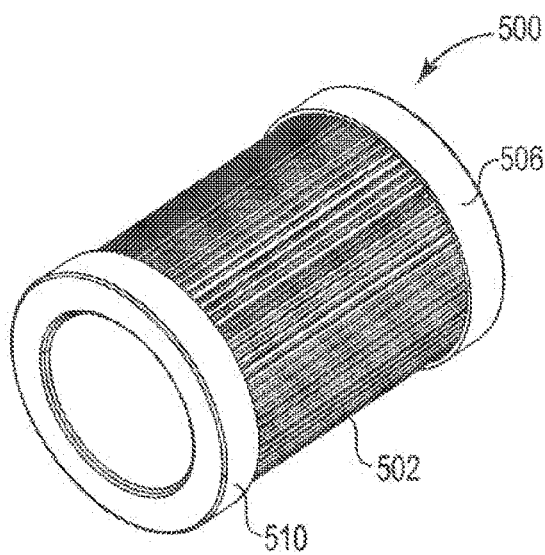
FIG. 8 is a bottom perspective view of the pleated filter assembly of FIG. 7.

One exemplary configuration of a filter assembly 500 including end caps is illustrated in FIGS. 7 and 8. Filter assembly 500 includes a filter pack 502 having filter material arranged in a manner consistent with the above pleated filter configurations. In this particular example, the pleated filter material has a pattern that repeats five times around its circumference to provide five flow channels or openings 504. At one end of the filter, a first end cap 506 is provided that has a central opening 508 through which material can flow. Although this opening 508 is illustrated as a circular opening, opening 508 can have a different shape and/or can be larger or smaller than illustrated. End cap 506 is provided with an inner lip or flange against which the outer pleat tips of the filter pack 502 will be positioned. End cap 506 may be adhered, welded, or otherwise attached to the pleat tips in order to secure the pleats in the desired configuration. The filter assembly 500 further includes a second end cap 510 at the opposite end of the filter pack 502 from first end cap 506. End cap 510 has a solid end surface that does not allow for material flow, thereby directing material flow through the opening 508 of end cap 506. Like first end cap 506, second end cap 510 may be adhered, welded, or otherwise attached to the pleat tips of the filter pack 502.

Figure 9:
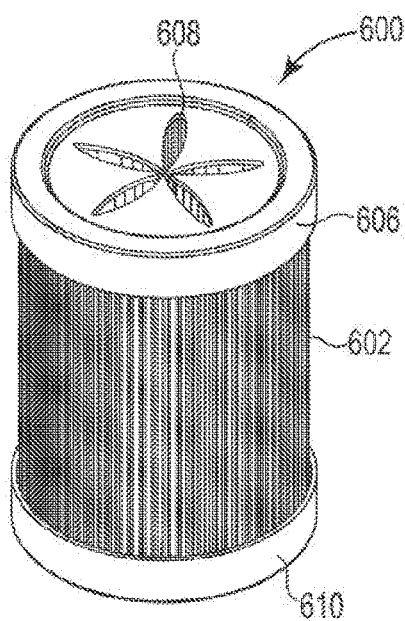
FIG. 9 is a perspective view of an embodiment of a pleated filter assembly of the invention that includes end caps.
Figure 10:
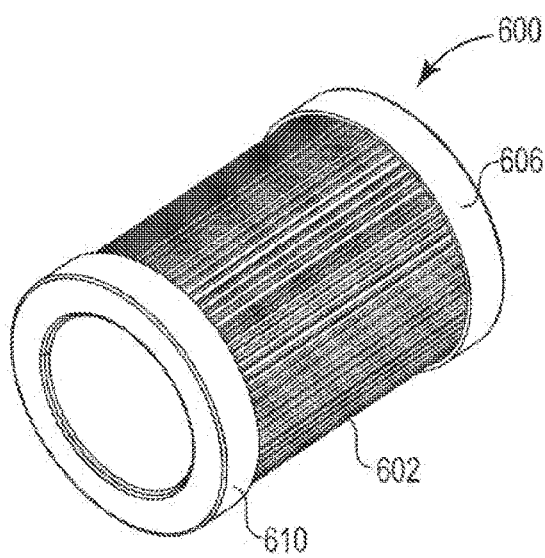
FIG. 10 is a bottom perspective view of the pleated filter assembly of FIG. 9.

Another exemplary configuration of a filter assembly 600 including end caps is illustrated in FIGS. 9 and 10. Filter assembly 600 includes a filter pack 602 having filter material arranged in a manner consistent with the above pleated filter configurations. In this particular example, the pleated filter material has a pattern that repeats five times around its circumference to provide five flow channels or openings. A first end cap 606 is provided at one end that includes five openings 608, each of which corresponds with one of the five flow channels or openings of the filter pack 602. Although openings 608 are illustrated petal or eye-shaped to generally match the shape of the flow channels, openings 608 can have a different shape and/or can be larger or smaller than illustrated. End cap 606 is provided with an inner lip or flange against which the outer pleat tips of the filter pack 602 will be positioned. End cap 606 may be adhered, welded, or otherwise attached to the pleat tips in order to secure the pleats in the desired configuration. The filter assembly 600 further includes a second end cap 610 at the opposite end of the filter pack 602 from first end cap 606. End cap 610 has a solid end surface that does not allow for material flow, thereby directing material flow through the openings 608 of end cap 606. Like first end cap 606, second end cap 610 may be adhered, welded, or otherwise attached to the pleat tips of the filter pack 602.

The filter configurations may include other features to provide additional support for the filter configurations after manufacturing. For example, one or more glue strips, elastic bands, or other features can be wrapped around all or part of the outer periphery of the pleated filter material at one or more locations between its ends. For another example, the filter may include an adhesive connecting the inner tips of at least two major pleats. The cylindrical filter material can also be positioned inside an outer tube member that extends along all or part of its height.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A filter assembly comprising:
   a cylindrical filter element comprising:
      a central longitudinal axis;
      filter media comprising a plurality of radially extending pleats arranged in a pattern that repeats around the central longitudinal axis, wherein:
         an outer cylindrical periphery of the filter media is defined by an outer pleat tip of each of the plurality of radially extending pleats; and
         each pattern of radially extending pleats comprises:
            a major pleat comprising two arms having a first length and extending radially from outer pleat tips in line with the central longitudinal axis and to an inner pleat tip;
            a minor pleat spaced from the major pleat, the minor pleat comprising two arms extending radially from outer pleat tips in line with the central longitudinal axis and to an inner pleat tip, wherein the arms of the minor pleat comprise a second length that is less than the first length of the arms of the major pleat;
            a first series of intermediate pleats positioned between the major pleat and the minor pleat; and
            a second series of intermediate pleats positioned between the minor pleat and the major pleat of an adjacent pattern of pleats;
      a plurality of flow channels extending along a height of the filter element, each of which is defined by the inner pleat tip of the minor pleat, an inner tip of each of the first and second series of intermediate pleats, and a portion of two adjacent major pleats;
   a first end cap positioned at a first end of the filter assembly, the first end cap comprising at least one opening; and
   a second end cap positioned at a second end of the filter assembly.

2. The filter assembly of claim 1, wherein the at least one opening of the first end cap comprises a single opening.

3. The filter assembly of claim 1, wherein the at least one opening of the first end cap comprises a plurality of openings, each of which corresponds with one of the plurality of flow channels.

4. The filter assembly of claim 3, wherein the plurality of flow channels each comprise one of an oval-shaped opening, a petal-shaped opening, or an eye-shaped opening, and wherein each opening of the first end cap comprises a corresponding oval-shaped opening, petal-shaped opening, or eye-shaped opening.

5. The filter assembly of claim 1, wherein the second end cap comprises a solid end surface.

6. The filter assembly of claim 1, wherein the cylindrical filter element comprises a first end surface spaced from a second end surface along the central longitudinal axis.

7. The filter assembly of claim 6, wherein the first and second end caps are attached the first end surface and the second end surface of the cylindrical filter element, respectively.

8. The filter assembly of claim 7, wherein the first and second end caps are adhered or welded to the first end surface and the second end surface of the cylindrical filter element, respectively.

9. The filter assembly of claim 1, wherein the first series of intermediate pleats of each pattern of pleats descends in length from a major pleat to a minor pleat, and wherein the second series of intermediate pleats of each pattern of pleats ascends in length from the minor pleat to a major pleat of an adjacent pattern of pleats.

10. The filter assembly of claim 1, wherein the inner pleat tip of the major pleat of at least one of the patterns of pleats is located at least 75% of the radial distance from the outer pleat tips toward the central longitudinal axis.

11. The filter assembly of claim 1, further comprising an adhesive connecting the inner tips of at least two major pleats.

12. The filter assembly of claim 1, wherein the inner pleat tip of at least one major pleat is located at the central longitudinal axis.

13. The filter assembly of claim 1, further comprising a central core to which the inner tip of at least one major pleat is attached.

* * * * *